B. E. ELDRED.
PROCESS OF MAKING CLAD METALS.
APPLICATION FILED JAN. 21, 1910. RENEWED FEB. 10, 1916.
1,217,581.
Patented Feb. 27, 1917.
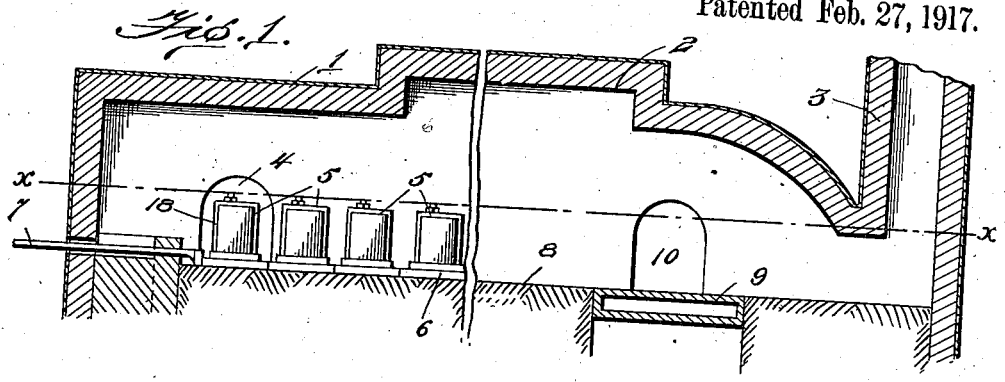
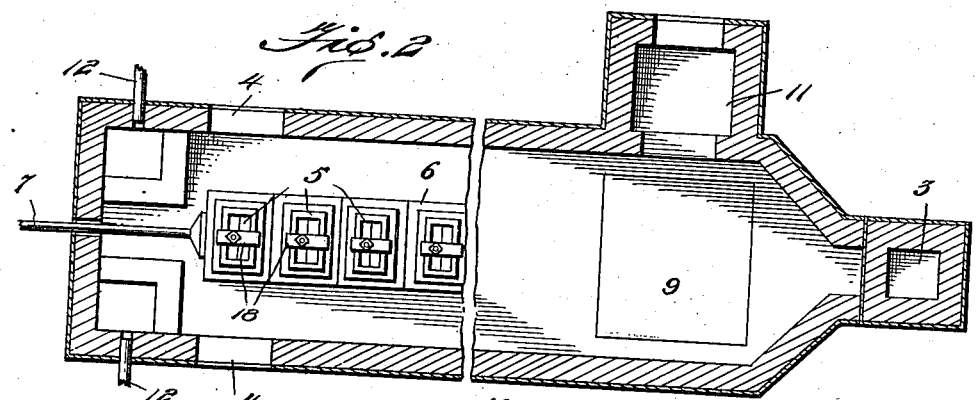
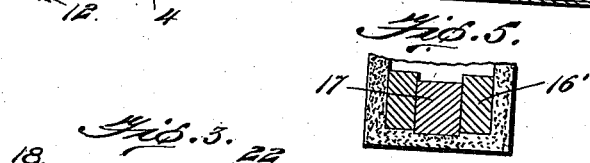
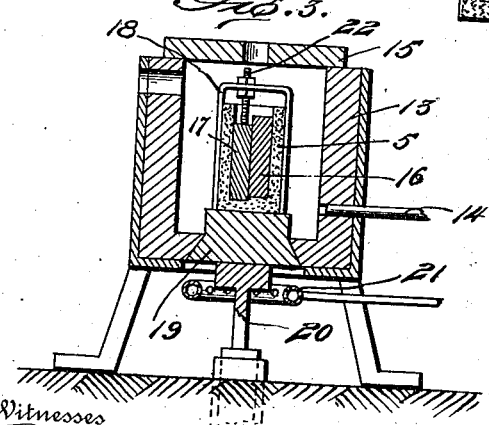
Witnesses
Inventor
Byron E. Eldred
By K. P. McElroy
Attorney

UNITED STATES PATENT OFFICE.

BYRON E. ELDRED, OF NEW YORK, N. Y., ASSIGNOR TO THE COMMERCIAL RESEARCH COMPANY, A CORPORATION OF NEW YORK.

PROCESS OF MAKING CLAD METALS.

1,217,581. Specification of Letters Patent. Patented Feb. 27, 1917.

Application filed January 21, 1910, Serial No. 539,245. Renewed February 10, 1916. Serial No. 77,526.

*To all whom it may concern:*

Be it known that I, BYRON E. ELDRED, a citizen of the United States, now a resident of New York, in the county of New York and State of New York, and formerly a resident of Bronxville, in the county of Westchester, have invented certain new and useful Improvements in Processes of Making Clad Metals, of which the following is a specification.

This invention relates to processes of making clad metals; and it comprises a process of firmly and permanently uniting bodies of unlike metals such as copper and steel, copper and nickel, etc., with a union which is, or is equivalent to, a weld union wherein bodies of such metals are placed with the line of intended union in a substantially vertical plane, are heated to a temperature equaling but preferably not much above the melting point of the lower melting metal, and the assembled metals are positively cooled in a methodical manner, such cooling being so conducted as to maintain a portion of molten metal under the influence of heat at the uppermost point along the line of intended union until the completion of such union, solidification of the metal along such line being caused to progress gradually upward; all as more fully hereinafter set forth and as claimed.

It has long been a desideratum to produce compound bodies of steel and copper united by a type of union permitting working down the joined bodies together like a unitary body of either metal. Such a type of compound metal is desirable because it permits the union of a substantial coating of copper to a large billet and a subsequent working down to form finished articles, the union being effected once for all in the original large mass. It is also desirable since it permits the production of bodies of steel covered with non-porous and impervious coatings of copper and the like, the coating being compacted in the working; something which it is not possible to produce by the ordinary methods of electroplating, electrocoatings being invariably porous and crystalline. While, as stated, such compound weld-united bodies have long been a desideratum, it has been but recently that it has been possible to make them commercially even in round shapes. Copper and steel are metals which are wholly unlike in their physical and chemical properties and they do not unite readily under ordinary conditions, a body of copper, for instance, cast against a body of steel remaining discrete therefrom and giving no union. Even where the solid and the fluid metal are both perfectly clean-surfaced, something which it is difficult to obtain in commercial practice, there is no union; there is at most a mere fitting together; an adhesion as distinguished from a cohesion. The two metals often do not seem to come into actual metallic contact and there is no cohesive union between them. No union is so obtained which will permit the metals being rolled or worked down together as a unitary body however far the co-extension be carried. Recently, however, it has been discovered that a cohesive union of the desired type may be obtained by the use of a number of expedients, such as the employment of copper at a very high temperature. I have now discovered that the desired type of cohesive union may be effected in a much simpler manner.

While it is usually stated that copper and steel have a lack of affinity for each other at the common casting temperatures of copper, yet this lack of affinity is not so great as is commonly believed; and in the described ordinary casting operation there are other coöperating causes which militate as much, or even more, against effecting the union as does the sheer weakness of affinity between the two metals.

When molten copper is cast against steel, if the steel be cold or much below the temperature of the copper because of the absorption of heat, such copper solidifies along the line of intended union before there is any real opportunity for the two metals to come into such a metallic and molecular contact as necessary for cohesive union, while of course any alloying or interpenetration of the two metals is out of the question. And subsequent working will not improve or form union in the absence of any initial metallic union since solid copper and solid steel do not unite even when compressed into contact with clean surfaces. And where any oxid, scale or the like exists on the surface of either metal, actual contact of the metals is obviously impossible. If the steel be hot, as is frequently proposed, it is also usually oxidized in heating, it being difficult commercially to heat steel without superficial oxidation. On now casting molten copper against the steel, the oxid prevents contact while, in the time that is allowed for and the conditions which occur in the operation, there is no opportunity for the escape of the "adsorbed" layer of gases which solid metals always carry. Molten copper always carries gas which it evolves in solidification and this gas, under the usual conditions of casting, is not permitted an opportunity to escape. Using the stated hot steel core or layer, it is apt to accumulate along the line between the two metals.

When copper is cast into a mold, whether containing a body of steel or not, the body of molten metal of course begins to solidify first where heat can escape by radiation and conduction. The side walls of the mold being exposed to skin cooling, a layer of solid copper forms next them while at the top of the layer, where air cooling is energetic, another solid layer accumulates. The result is that the evolved gases cannot escape, being imprisoned either within the mass of copper itself, or, where a hot steel layer is employed, along the bounding lines of the two metals. By a simple rearrangement of conditions, this evolving gas can be made an aid in effecting the union rather than a hindrance. As to the way in which the gas operates, I cannot at present say, contenting myself with merely noting the fact that it appears to be a help rather than a hindrance.

Another disadvantage of the stated casting method in practice is the eroding or washing action of the heavy body of hot molten metal upon the surface of the steel where the latter is hot and softened.

I have found that if a body of steel be placed in a mold or receptacle, which is best made of a material which conducts heat freely, such as the newer varieties of homogeneous and compact graphite, ("artificial graphite"), and a body of copper be placed next thereto and the assemblage heated up to the fusing point of copper, but not necessarily or advantageously much above, and then locally cooled in a special and particular manner while maintaining the heat, cohesively united compound bodies of copper and steel may be readily attained; such bodies being capable of subsequent co-extension to any extent desired without rupture or parting of the union and with a substantial co-extension in equal degree throughout. Molten copper may be used instead of melting a preformed solid body of copper, such molten copper being cast into contact with the steel, but its use offers no advantage and is not as simple, ordinarily. By using a preformed body of solid copper, it can be made clean-surfaced and can be produced in a convenient manner, while by casting molten copper directly into contact with the steel itself in the mold the described washing action is apt to take place.

After raising the copper and iron in the mold to the desired temperature, the assemblage is next locally cooled in such a manner that a solidification along the line of union progresses upward from the bottom-most to the topmost metal, the layer of molten metal between the two metals remaining fluid longer at all upper points along such line than at any lower point. This may be, and advantageously is, accomplished by cooling the base of the metals while maintaining the heat at their top. It is not desirable that the exterior layers, that is those next to the side walls of the mold shall solidify early, but it is not particularly disadvantageous. But it is desirable that the top layer shall remain fluid longer than the bottom layer and that solidification of the copper shall progress regularly from below upward. In practice this can only be done by continuing the heating of the mold. In so doing the gases as they rise and go toward the center find a free vent through the topmost, still liquid copper and are able to exercise whatever influence they may have on the surface of the steel as they rise therealong. Under the described conditions the gas is able to rise throughout the mass of still molten metal, and such oxid as may be entangled in the copper or adhering to the surface of the steel can also rise by virtue of its comparatively low specific gravity which is still further lowered by the tendency of the evolving gas to cling to solid particles. It may be also that in the described operation the carbon on the surface of the steel and the oxygen in the copper react to form further gas and carbonless iron (which unites with copper with comparative readiness), but as to this I express no opinion. At all events, by performing the described operation in the described manner sound unions are effected. The copper of the coating also forms an unusually sound and perfect casting, being free of blowholes, porosity, sponginess and the like and exhibiting on its outer surface the exact contour of the mold in which it is produced.

Where it is desired to use molten copper directly, the copper may be cast in the mold next to the properly heated steel and the assemblage allowed to cool under maintenance of top heat in the methodical manner just stated. Where the copper is already molten it is obviously not necessary to reheat, except in so far as may be necessary in keeping the top layer molten until the last by the stated top heating. Where, as is sometimes convenient, the slab of copper to be used is produced in the mold itself, the steel being placed in position in the mold and the copper cast against it and the whole allowed to stand and cool, the assemblage must of course be reheated to melt the copper prior to cooling and solidifying the copper in the described methodical manner.

The present process may be used to produce steel cores coated on all sides such as round bodies having a steel core and an annular copper sheath, or it may be used for producing steel bodies faced or coated on less than all sides, as for instance, in making compound bars for sheets carrying the copper on but one face or side. I shall hereinafter describe it more fully in connection with its application for single faced bodies.

The heating and cooling in the described manner may be performed in a variety of ways and with a variety of apparatus. One convenient way of cooling after the melting operation is simply to pass the mold containing the two metals upon a water-cooled base while allowing the heat to continue to play upon the top of the mold. The cooling will insure solidification going upward through the mass against the top heat resulting from the upper portion of the copper being still exposed to the heat.

In a simple, cheap and ready method of operation using a reverberatory or like type of furnace, a body of steel may be placed in a container of synthetic graphite with a slab or bar of copper next thereto and the mold placed in the front of the furnace. The mold may now be pushed along the floor of the furnace from one end to the other and during its progress the copper brought to a state of fusion. After the fusion is complete the mold may be pushed on a special water-cooled floor at the end of the furnace while still exposed to the flames of the furnace, thereby securing the desired differential temperature between the top and the bottom. It may be retained on this water-cooled floor until solidification is complete. By reason of the high conductive power of the copper, the heat abstracted by the cooled lower layer of copper will bring about the final solidification of the top layer in spite of the heat playing upon it. In a simpler, discontinuous manner of operation, the two metals may be placed in a crucible or mold of the character described, exposed to heat until the copper is molten and then without discontinuing the heat the base of the mold may be cooled by dipping in water, or spraying water upon it, air cooling, etc.

Upon removal of the solidified joined metals from the crucible in either method of operation they will be found united with a union of the type described and the copper will be found to be an absolutely homogeneous perfect ingot. The present method of fusing and cooling may, indeed, be employed for making sound copper ingots or castings, no steel being placed in the mold in this case.

While a variety of materials may be used for the mold in the described operation, I prefer the described type of graphite. Iron or steel may be used but is less suitable since it is difficult to prevent the copper welding to its surface, giving an outer layer of steel. However, where a steel-cased, copper-cored article is desired, the copper may be so united to a tube mold of steel, the steel for the casing serving also as the crucible or mold.

The described method may of course be employed in making multilayer articles, such as, for instance, a compound bar having a layer of steel and a layer of nickel united by a layer of copper.

The absolute control of the operation afforded by the relatively low furnace temperatures employed and the fact that the operation may be stopped at any point makes the process particularly adapted for producing a cohesive union between copper and nickel. Nickel, and particularly the comparatively pure, relatively carbonless varieties of the commercial metal, is apt to alloy and intermix with the copper in any method involving relative movement of the two metal masses, copper passing into the nickel and nickel into the copper, but by placing a body of such nickel next to or within a body of copper and then cautiously conducting the heating till the copper is fused and then quickly cooling in the stated manner no time or opportunity is afforded for more than a superficial alloying, which is more or less desirable as promoting the union. No liquid copper need be flowed past the nickel surface with attendant washing and eroding, which is apt to be serious with these two metals, nor is there any stirring up or intermingling, as is apt to be the case in dipping operations.

While I have more particularly described my invention with reference to the union of copper and steel, it is to be understood that it is equally applicable to uniting copper with nickel, cobalt, iron, the various alloy steels, etc., and indeed may be used with any of the other iron-like or ferrous metals. I may also use other copperlike and cuprous metals such as gold, silver, brass, bronze, aluminum-bronze, etc., in lieu of the copper in forming compound metals comprising a layer of an iron-like metal.

While I regard my process as particularly adapted for making slabs or bars of steel coated on one or more faces with copper intended for rolling down to single or double faced sheets and plates, yet, as stated, it may also be employed for making rounds intended for manufacturing compound wire or other shapes. In such a case, a tubular body of copper is substituted for the bar or slab of copper. For most commercial purposes, the presence of iron in the copper is not disadvantageous, and is even advantageous in proper proportions as giving greater tensile strength, but for wire for electrical purposes there should be substantially no iron in the bulk of the coating, the presence of iron being confined to a thin intermediate layer of linking metal between the steel core and the body of the coating since iron runs down the conductivity of copper to a degree out of all proportion to its sheer amount. In making such electrical goods therefore, bodies of substantially pure, substantially iron-free copper should be employed and the operation carefully conducted to avoid any agitation of the body of molten copper or any relative movement of the two metal masses.

In the accompanying illustration, I have shown more or less diagrammatically, certain assemblages of apparatus elements within the present invention and suitable for use in the described process. In this showing:

Figure 1 is a vertical section of a furnace containing molds;

Fig. 2 is a horizontal section of the same furnace taken along line x—x of Fig. 1;

Fig. 3 is a vertical section of a simple type of discontinuous furnace showing a mold in position;

Fig. 4 is a vertical section of a mold carried by a shoe; and

Fig. 5 a similar view of a mold.

In the structure of Fig. 1, element 1 is a furnace chamber of the reverberatory type having a shallow recess 2 in its arch and a stack 3 for removing waste gases. Door 4 permits the introduction of the molds 5, each of which is shown as mounted in a flat shoe 6 of steel or like material. Pusher 7 engages a train of molds and pushes them along the floor 8 until they reach the water-cooled section 9 opposite door 10 leading (see Fig. 2) to the side chamber 11. A pair of oil burners 12 are shown as furnishing the heat for the device.

In Fig. 3, furnace chamber 13, provided with oil burner 14 and lid 15, is shown as containing a mold carrying a body of copper 16 and a body of steel 17. Around the mold passes a strap 18 to permit handling. The mold rests as shown upon a removable section 19 of the floor of the furnace, this section being carried by ram 20. Annular water pipe 21 permits the projection of cooling water upon the base of the mold.

Hold-down means 22 keeps the steel from rising.

In the operation of the structure of Fig. 1, molds 5 carrying a bar of steel or like metal 17 and a bar of copper 16, the latter being slightly longer to allow for settling, are pushed on the furnace floor through door 4. The pusher 7 engages the steel shoe carrying the bottom of the mold and pushes the mold forward along the length of the furnace, the pusher being retracted as each new mold is introduced and the process repeated until there is a train of molds reaching as far as the water-cooled floor 9. As this train of molds passes forward along the length of the furnace, the copper 16 is brought to the point of fusion and the liquid metal occupies the space between 17 and the sides of the mold. If it be desired to make a copper ingot, the billet or slab 17 is simply omitted. If it be desired to produce steel coated on all sides, then an annular sleeve of copper 16' (see Fig. 5) is substituted for the flat slab 16 and the round billet 17 inserted within it. As the train of molds passes along the length of the furnace, the assembled molds are heated until the copper is brought to the point of fusion, but not necessarily or advantageously much above. The steel is kept from rising or being displaced by 22. The recess 2 in the roof of the furnace produces a concentration of heat at a point just before the water-cooled floor 9. As each new mold reaches this water-cooled floor, it is cooled from below upward by the abstraction of heat by such water-cooled floor and the copper solidifies from the bottom upward. During this solidification, the heat of the furnace is still playing upon the top of the mold and maintaining the top copper molten to the last, thereby giving the gases an opportunity to rise. The mold is preferably made of some of the newer varieties of synthetic graphite (as shown in Fig. 4), this being a material which conducts heat with comparative readiness while it does not weld with the copper, as would an iron or steel mold. The shoe not only facilitates the absorption of the heat by the floor 9 in the cooling stage, but aids in the pushing operation by taking the stress from the pusher. The operation of the structure of Fig. 3 is similar. The mold carrying the two metals is placed on the movable bottom 19 and heated by the flame from 14 until the copper melts. The mold and movable bottom are now lowered by 20 until the bottom of the mold is below 21, while the head of the mold is still exposed to the flame of the furnace. Water is now sprayed upon the bottom of the mold, producing a bottom solidification, while the heat of the furnace maintains the top layer of the copper molten until the last. An air blast may be used in lieu of water.

As iron and steel are somewhat lighter specifically than copper, it is desirable to provide hold-down means such as 22 to keep the former metal in place during the operation.

In the showing of Fig. 5, 16' may be taken either as an annular sleeve of copper surrounding round core bar 17, or as a pair of copper plates with a steel plate between them for making a double-faced article.

What I claim is:—

1. The process of making clad metals which comprises placing a body of a high-melting ironlike metal in a mold, placing a body of an unlike, non-ferrous high melting metal of somewhat lower melting point in contact therewith, raising the temperature until the second-named metal melts and cooling the mold and contents from below upward by abstraction of heat from the bottom thereof while still supplying heat to the residue of the mold so that the topmost layer of molten metal shall be the last to solidify.

2. The process of making clad metals which comprises placing a body of a high-melting ferrous metal in a mold, placing a body of an unlike, non-ferrous high melting metal of somewhat lower melting point in contact therewith, raising the temperature until the second-named metal melts and cooling the mold and contents from below upward by abstraction of heat from the bottom thereof while still supplying heat to the residue of the mold so that the topmost layer of molten metal shall be the last to solidify.

3. The process of making clad metals which comprises placing a body of steel in a mold, placing a body of an unlike, non-ferrous high melting metal of somewhat lower melting point in contact therewith, raising the temperature until the second-named metal melts and cooling the mold and contents from below upward by abstraction of heat from the bottom thereof while still supplying heat to the residue of the mold so that the topmost layer of molten metal shall be the last to solidify.

4. The process of making clad metals which comprises placing a body of steel in a mold, placing a body of copper in contact therewith, raising the temperature until such copper melts and cooling the mold and contents from below upward by abstraction of heat from the bottom thereof while still supplying heat to the residue of the mold so that the topmost layer of molten metal shall be the last to solidify.

5. The process of producing a sound body of copper which comprises placing a body of copper in a mold, raising the temperature until such copper melts and cooling the mold from below upward by the abstraction of heat from the bottom thereof while still supplying heat to the residue of the mold so that the topmost layer of molten metal shall be the last to solidify.

6. The process of producing clad metals which comprises cooling a body of solid high-melting ironlike metal and a body of molten high-melting non-ferrous metal resting in contact therewith in a suitable mold, the body of such mold being exposed to heat during such cooling and such cooling being produced by a basal chilling of the mold and contents and being so conducted that the topmost layers of molten metal shall be the last to solidify.

7. The process of producing clad metals which comprises cooling a body of solid ferrous metal and a body of molten high-melting non-ferrous metal resting in contact therewith in a suitable mold, the body of such mold being exposed to heat during such cooling and such cooling being produced by a basal chilling of the mold and contents and being so conducted that the topmost layers of molten metal shall be the last to solidify.

8. The process of producing clad metals which comprises cooling a body of solid steel and a body of molten high-melting non-ferrous metal resting in contact therewith in a suitable mold, the body of such mold being exposed to heat during such cooling and such cooling being produced by a basal chilling of the mold and contents and being so conducted that the topmost layers of molten metal shall be the last to solidify.

9. The process of producing clad metals which comprises cooling a body of solid high-melting ironlike metal and a body of molten cupriferous metal resting in contact therewith in a suitable mold, the body of such mold being exposed to heat during such cooling and such cooling being produced by a basal chilling of the mold and contents and being so conducted that the topmost layers of molten metal shall be the last to solidify.

10. The process of producing clad metals which comprises cooling a body of solid steel and a body of molten cupriferous metal resting in contact therewith in a suitable mold, the body of such mold being exposed to heat during such cooling and such cooling being produced by a basal chilling of the mold and contents and being so conducted that the topmost layers of molten metal shall be the last to solidify.

11. The process of producing clad metals which comprises cooling a body of solid steel and a body of molten copper resting in contact therewith in a suitable mold, the body of such mold being exposed to heat during such cooling and such cooling being produced by a basal chilling of the mold and contents and being so conducted that the topmost layers of molten metal are the last to solidify.

12. The process of forming copper-clad metal which comprises placing a body of steel in a thermally conductive mold, placing a body of copper in contact therewith, placing the mold upon the floor of a flame heated furnace, pushing the mold along the said floor until the copper melts, and then positively cooling the bottom of said mold until the copper solidifies while still allowing the furnace flame to heat the top of the mold.

13. The process of forming clad metals which comprises placing a body of one high-melting metal in a thermally conductive mold, placing a body of a second high-melting metal having a somewhat lower melting point in contact with the first-named metal, pushing the mold progressively along the floor of a flame heated furnace until the second-named metal melts and then positively cooling the bottom of said mold until the latter metal solidifies while still allowing the flame to heat the top of the mold.

14. The process of forming cast copper which comprises placing a body of copper in a mold, pushing the mold along the floor of a flame heated furnace until such copper melts and then positively cooling the bottom of such mold until the copper solidifies while still allowing the flame to heat the top of the mold.

15. The process of forming a sound body of copper which comprises cooling and solidifying a body of molten copper in a thermally conductive mold exposed to high heat, said cooling being performed by abstraction of heat from the bottom of the mold while the rest of the mold is still exposed to heat so that the topmost layers of molten metal shall be the last to solidify.

16. The process of forming a sound body of copper which comprises basally and positively cooling a body of molten copper in a thermally conductive mold while exposing the body of the mold to heat, such cooling and heating being so performed as to cause the regular progress upward of the solidification of the molten metal.

17. The process of uniting an iron-like metal with a copper-like metal which comprises producing an assemblage of a vertically placed body of the iron-like metal and a contacting vertical layer of molten copper-like metal in a mold in a chamber at a temperature above the melting point of said copper-like metal and while said mold and contents are still exposed to the heat in said chamber, producing a forced cooling and solidification of said molten metal by cooling applied to the base of said mold.

In testimony whereof, I affix my signature in the presence of witnesses.

BYRON E. ELDRED.

Witnesses:
JOHN A. RILEY,
A. M. SENIOR.